United States Patent [19]
Sahara

[11] Patent Number: 5,581,164
[45] Date of Patent: Dec. 3, 1996

[54] KEYSTONE DESCRIPTION CORRECTING CIRCUIT USING HIGH VOLTAGE CORRECTION CIRCUIT AND FEEDBACK FROM THE VERTICAL DEFLECTION COIL

[75] Inventor: Hiroshi Sahara, Kanagawa, Japan

[73] Assignee: Sony Corporation, Tokyo, Japan

[21] Appl. No.: 555,507

[22] Filed: Nov. 8, 1995

Related U.S. Application Data

[63] Continuation of Ser. No. 126,187, Sep. 24, 1993, abandoned.

[30]    Foreign Application Priority Data

Sep. 29, 1992 [JP] Japan ................................. 4-259216
Sep. 29, 1992 [JP] Japan ................................. 4-259217

[51] Int. Cl.$^6$ .............................. G09G 1/04; H01J 29/70
[52] U.S. Cl. ................................... 315/371; 315/387
[58] Field of Search ............................. 315/371, 387, 315/389, 411

[56]    References Cited

U.S. PATENT DOCUMENTS

| | | | |
|---|---|---|---|
| 3,890,541 | 6/1975 | McCarthy et al. | 315/366 |
| 3,949,270 | 4/1976 | Akatsu et al. | 315/411 |
| 4,063,134 | 12/1977 | Iida | 315/371 |
| 4,665,347 | 5/1987 | Walker et al. | 315/411 |
| 4,752,722 | 6/1988 | Erratico et al. | 315/403 |
| 4,927,219 | 5/1990 | Golik | 315/371 |
| 5,177,413 | 1/1993 | Wilber | 315/371 |

*Primary Examiner*—Gregory C. Issing
*Attorney, Agent, or Firm*—Jay H. Maioli

[57]    ABSTRACT

A flat type CRT includes a horizontal deflection circuit and/or a vertical deflection circuit, in which order to prevent undesired zooming without using a high voltage regulator, reduce an amount of overscanning, and stabilize the picture, the deflection circuit is separated from a high voltage generating circuit, and a capacitor is provided between the high voltage generating circuit and the deflection circuit. The capacitor is arranged to provide a low voltage $\Delta HV$ proportional to an anode voltage HV. This low voltage is added to the output of a transistor so that the level of the deflection voltage is varied.

7 Claims, 4 Drawing Sheets

KEYSTONE DESCRIPTION CORRECTING CIRCUIT USING HIGH VOLTAGE CORRECTION CIRCUIT AND FEEDBACK FROM THE VERTICAL DEFLECTION COIL

This is a continuation of application Ser. No. 08/126,187 filed Sep. 24, 1993 now abandoned.

BACKGROUND OF THE INVENTION

The present invention relates to television monitors having CRTs such as compact flat CRTs of small picture sizes, and more specifically to circuits for zooming correction in such CRT displays.

There are two different horizontal deflection systems, the conventional type and a separate type. A horizontal deflection circuit is separated from a high voltage generating circuit in the separate type, while the horizontal deflection circuit is not separated in the conventional type. The conventional type is adequate when a correction quantity for image error such as barrel distortion is small. When the correction quantity is great, however, adverse influence on the high voltage is significant, and accordingly the conventional type is not advisable.

The flat type CRT employs the separate type because the required correction quantity for distortion in the shape of an inverted trapezoid is very great. The separate type is advantageous in that it is free from interference between the high voltage supply circuit and the horizontal deflection circuit. Because of the separation, however, the horizontal deflection voltage remains constant while the high voltage varies, resulting in a phenomenon called zooming in which the picture size is varied.

A vertical deflection circuit is separate from the high voltage generating circuit of the CRT, and is also liable to cause zooming in the vertical direction. In the high voltage supply circuit, the anode voltage supplied to the anode varies in dependence on the anode current. In the vertical deflection circuit, on the other hand, the sawtooth current (vertical deflection current) of the vertical frequency period is supplied to the vertical deflection coil. The level of the vertical deflection current is constant irrespective of variation in the anode voltage. The result is vertical zooming in which the picture size varies in the vertical direction.

In such television receivers, therefore, the arrangement of the horizontal and vertical deflection circuits separate from the high voltage supply circuit tends to incur undesired variations in the horizontal and vertical picture sizes.

In general, the separate system employs a high voltage regulator to prevent this undesired zooming. This solution is useless, however, when the requirements for reducing power consumption and cost are critical as in the flat type CRTs. Another conventional solution is to increase the amount of overscan of the beam in each of the horizontal and vertical directions. However, this solution is still unsatisfactory in its high output and high cost, and incompetent for stabilization of the picture

SUMMARY OF THE INVENTION

It is therefore an object of the present invention to provide a flat type CRT circuit which can prevent the undesired zooming, minimize the overscanning and stabilize the picture.

According to the present invention, a flat type CRT circuit or television monitor comprises a high voltage generating circuit for supplying an anode voltage to an anode of the CRT, a horizontal or vertical deflection circuit for supplying a horizontal or vertical deflection voltage to a horizontal or vertical deflection coil, and a correction section for obtaining a low voltage proportional to the anode voltage. The deflection circuit is separate from the high voltage generating circuit. The deflection voltage level of the deflection circuit is varied in accordance with the low voltage of he correction section.

The deflection voltage is varied in accordance with the anode voltage (high voltage). The size of the picture formed by the scanning of a beam is held approximately constant. Furthermore, the present invention can make it possible to perform the control with a low output, and reduce the cost by employing a capacitor in the correction section.

DETAILED DESCRIPTION OF THE INVENTION

FIGS. 1–4 show a part of a flat type CRT circuit according to a first embodiment of the present invention.

Figure 1:
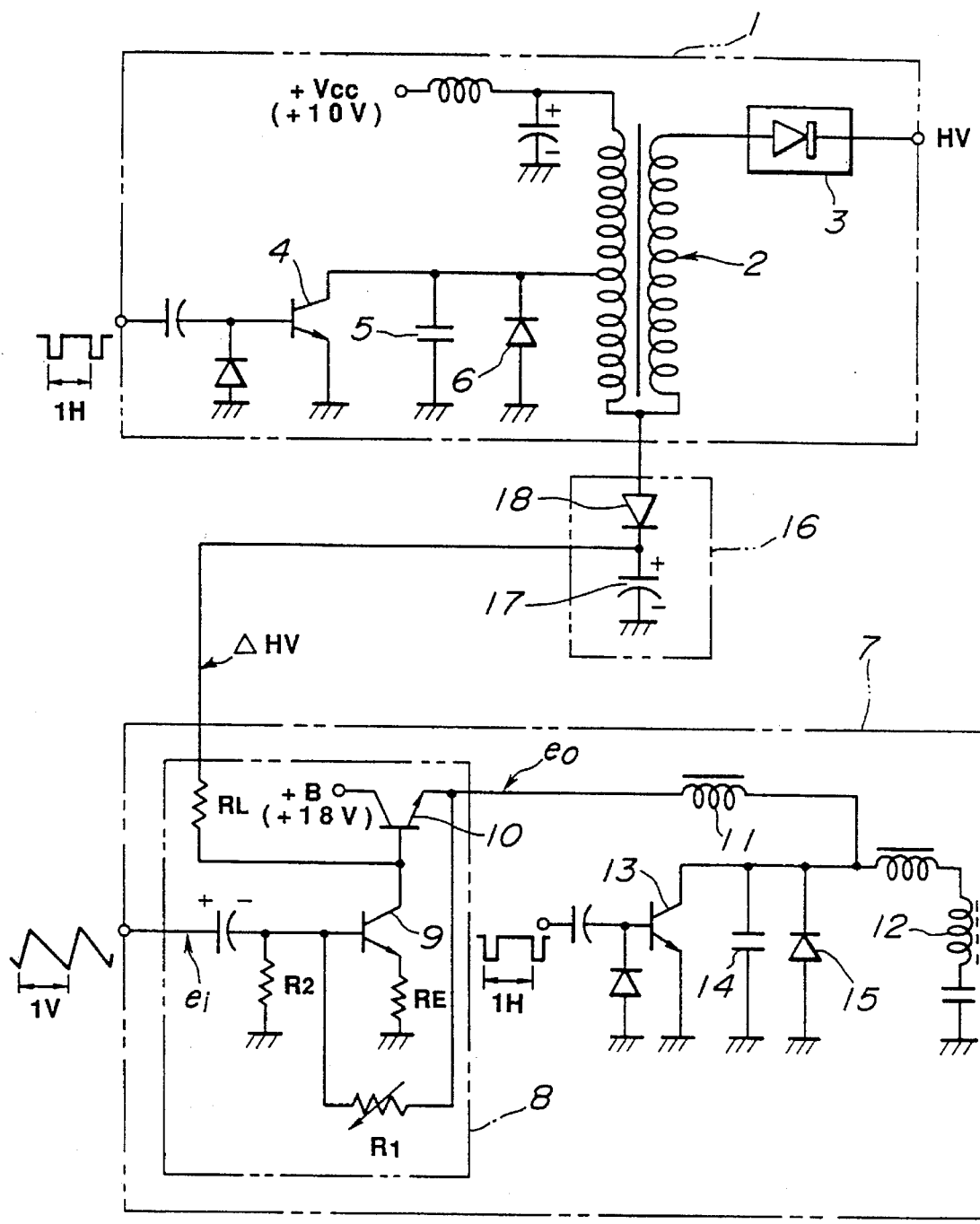
FIG. 1 is a diagram showing a part of a flat type TV according to a first embodiment of the invention.

The circuit shown in FIG. 1 has a high voltage generating circuit 1 including a flyback transformer 2. A constant voltage power source (+Vcc) is connected to one end of the primary side of the flyback transformer 2. One end of the secondary side of the flyback transformer 2 is connected to a voltage multiplying rectifier circuit 3. The high-voltage generating circuit further includes a transistor 4, a resonating capacitor (or condenser) 5, and a damper diode 6. The transistor 4 has a collector terminal connected with an intermediate tap, such as a center tap, of the primary side of the flyback transformer 2, and a base terminal to which a rectangular (or square) wave voltage of a horizontal frequency period is applied.

A horizontal deflection circuit 7 shown in FIG. 1 includes a keystone correcting section 8 having first and second transistors 9 and 10. A sawtooth voltage of a vertical frequency period is applied to a base terminal of the first transistor 9. The second transistor 10 has a base terminal connected with a collector terminal of the first transistor 9, a collector terminal connected with a constant voltage source (+B), and an emitter terminal which is connected through a resistor R1 with the base terminal of the first transistor 9 to form a loop of negative feedback.

The emitter terminal of the second transistor 10 is connected through a choke coil 11 to a horizontal deflection coil 12, and a transistor 13. A voltage $e_O$ obtained from the emitter terminal of the second transistor 10 is supplied through the choke coil 11 to the horizontal deflection coil 12, and the transistor 13. A rectangular wave voltage of the horizontal frequency period is applied to the base of the transistor 13. The horizontal deflection coil 12 receives a horizontal deflection current of a sawtooth waveform as the transistor 13 turns on and off. There are further provided a resonating capacitor (or condenser) 14 and a damper diode 15.

A correction power source section 16 shown in FIG. 1 includes a capacitor (or condenser) 17, one end of which is connected through a diode 18 with a low voltage end of the primary side of the flyback transformer 2. The capacitor 17 is charged by a pulse voltage of the flyback transformer 2. Therefore, the capacitor 17 is charged with a low voltage $\Delta HV$ proportional to an anode voltage HV. The end of the capacitor 17 is connected through a resist or RL with the collector terminal of the first transistor 9. The base of the second transistor 10 receives a voltage resulting from addition of the low voltage $\Delta HV$.

Figure 2:
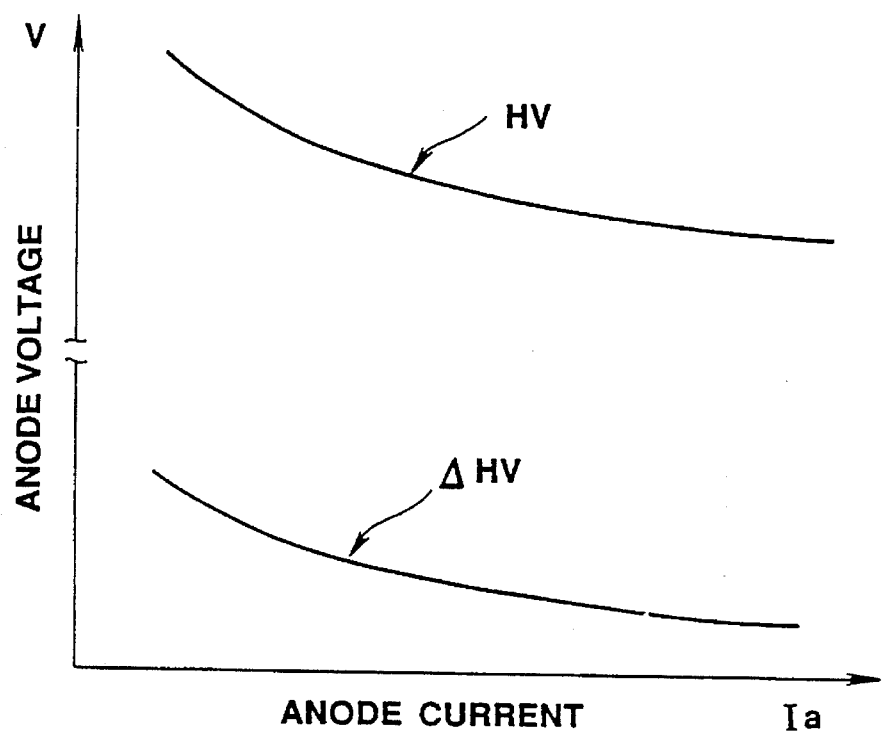
FIG. 2 is a graph showing a characteristic between an anode voltage (HV) and a lower voltage ($\Delta$HV) in the circuit shown in FIG. 1.

The thus-constructed circuit shown in FIG. 1 is operated as follows: In the high voltage generating circuit 1, the rectangular wave voltage signal is applied to the base terminal of the transistor 4 Accordingly, the collector current flows during the beam scanning period, but the collector current is abruptly shut off in the blanking period, so that a high voltage pulse is generated in the secondary side of the flyback transformer 2 in the blanking period. The rectifier circuit 3 increases this high pulse voltage, and provides a high anode voltage HV (6~7 kV). This anode voltage HV varies accordingly as the anode current increases and decreases, and the capacitor 17 of the correction section 16 is charged with the low voltage $\Delta HV$ proportional to the anode voltage HV by the above-mentioned pulse voltage, as shown in FIG. 2.

In the horizontal deflection circuit 7, the sawtooth signal of the vertical frequency period is supplied to the base terminal of the first transistor 9 in the keystone correction section 8, and there appears, at the emitter of the second transistor 10, the voltage $e_O$ modulated by this sawtooth wave. On the other hand, the rectangular wave of the horizontal period is applied to the base terminal of the transistor 13, and the transistor 13 turns on and off. Therefore, the sawtooth wave current of the horizontal period is supplied to the horizontal deflection coil 12. This sawtooth wave current undergoes modulation of the vertical period. This modulation corrects a distortion in the shape of an inverted trapezoid.

In the horizontal deflection circuit 7, a relationship between the voltage $e_O$ and the deflection current Ipp is expressed as;

$$e_O = Ly \cdot (Ipp/Ts) = K \cdot Ipp$$

Figure 3:
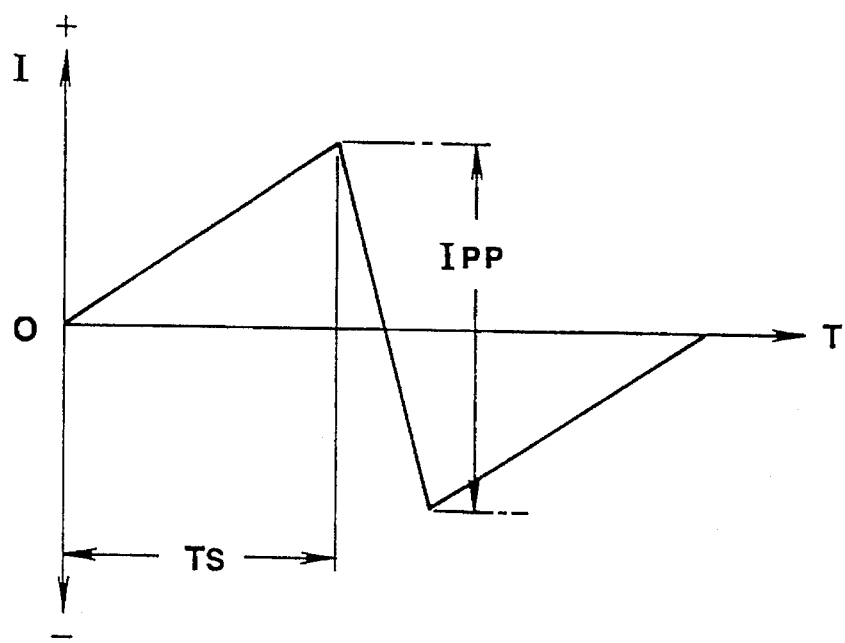
FIG. 3 is a schematic view showing the waveform of a horizontal deflection current appearing in the circuit shown in FIG. 1.

$(K=Ly/Ts:$ constant$)$ where Ly is an inductance of the horizontal deflection coil 12, and Ts is ½ of the horizontal period as shown in FIG. 3. Since the voltage $e_O$ varies in proportion to $\Delta HV$, the deflection current Ipp varies, following a high voltage variation (HV+$\Delta HV$).

Figure 4:
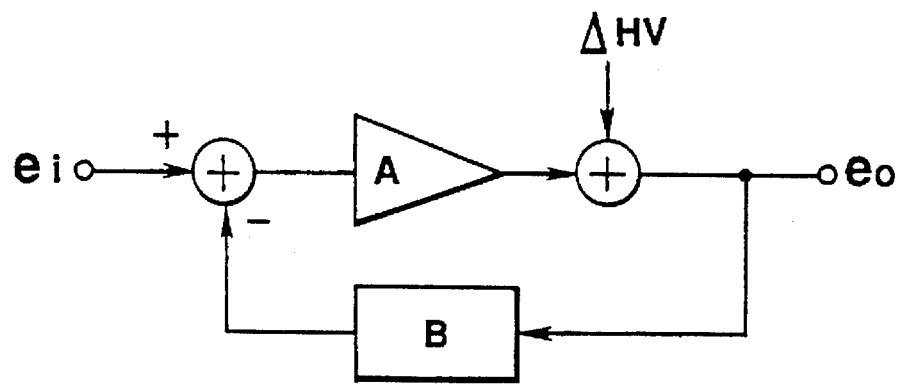
FIG. 4 is a diagram showing an equivalent circuit of a keystone correction section of the embodiment.

FIG. 4 shows an equivalent circuit of the keystone correcting section 8. By using A=RL/RE and B=R2/(R1+R2), the output voltage $e_O$ is given by;

$$e_O = A(e_i - Be_O) + \Delta HV = \{A/(1+AB)\}e_i + \Delta HV/(1+AB)$$

Therefore, by setting the loop gain AB at a desired value, it is possible to hold the picture size of the beam approximately constant without regard to variation in the anode voltage.

When, in the example having no negative feedback, the input is changed to 1/(1+AB) to obtain the same output, then $e_O$ is given by;

$$e_O = \{A/(1+AB)\} \cdot e_i + \Delta HV$$

In this embodiment, $\Delta HV$ is used as the drive voltage for the second transistor 10, so that the load of the flyback transformer 2 is light. Furthermore, the correction power source section 16 is arranged to perform pulse rectification by rectifying positive pulses like the anode voltage, so that the circuit can follow up faithfully.

Figure 5:
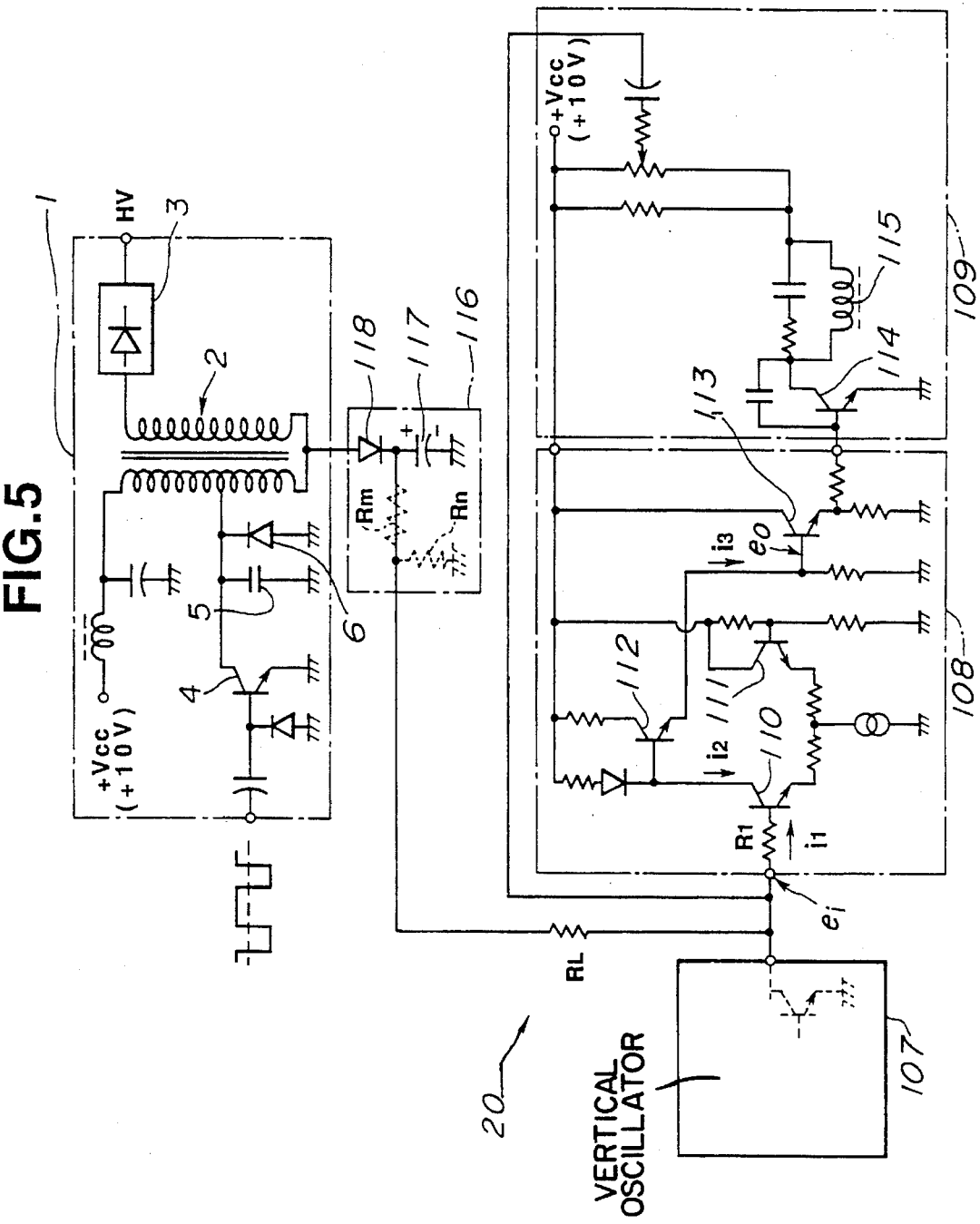
FIG. 5 is a diagram showing a part of a flat type CRT circuit according to a second embodiment of the present invention.

FIG. 5 shows a part of a flat CRT circuit according to a second embodiment of the present invention. As shown in FIG. 5, this CRT circuit includes a high voltage generating circuit 1, which is the same as the high voltage generating circuit 1 shown in FIG. 1. The explanation about the high voltage circuit 1 of FIG. 1 holds for the circuit 1 of FIG. 5.

A vertical deflection circuit 20 shown in FIG. 5 is constituted by a vertical oscillating section 107, a vertical drive section 108, and a vertical output section 109. The vertical oscillating section 107 generates a sawtooth voltage of the vertical period, and supplies this voltage to the vertical drive section 108.

The vertical drive section 108 includes two transistors 110 and 111 constituting a differential amplifier. The above-mentioned sawtooth voltage signal of the vertical oscillating section 107 is supplied to the base terminal of the transistor 110. A constant voltage is applied to the base terminal of the transistor 111. Thus, the sawtooth voltage is differentially-amplified. A current mirror transistor 112 takes out a current $i_3$ equal to the collector current $i_2$ of the transistor 110 ($i_3=i_2$), and provides a sawtooth voltage $e_O$. This sawtooth voltage $e_O$ is delivered through a buffer transistor 113 to the vertical output section 109. The vertical output section 109 acts to perform class A amplification. The gain A is;

$$A = e_O/e_i = i_3 \cdot R2/i_1 \cdot R1$$

Since $i_2 = i_3$;

$$A = (i_2/i_1) \cdot (R2/R1)$$

The vertical output section 109 operates a transistor 114 with the sawtooth voltage $e_O$, and supplies a vertical deflection current in a sawtooth waveform to a vertical deflecting coil 115. A voltage proportional to the vertical deflection current of the vertical deflecting coil 115 is fed back to the input terminal of the vertical drive section 108.

A correction power source section 116 shown in FIG. 5 includes a capacitor (or condenser) 117, one end of which is connected through a diode 118 with a low voltage end of the primary side of the flyback transformer 2. The capacitor 117 is charged by a pulse voltage of the flyback transformer 2. Therefore, the capacitor 117 is charged with a low voltage $\Delta HV$ proportional to an anode voltage HV, as shown in FIG. 2. The end of the capacitor 117 is connected through a resistor $R_L$ with the input terminal of the vertical drive section 108. The low voltage $\Delta HV$ is added to the base terminal of the second transistor 110. When the voltage $\Delta HV$ is too high, it is possible to utilize a desired fraction of the voltage by inserting a voltage divider of resistors Rm and Rn shown by imaginary lines in FIG. 5.

The circuit shown in FIG. 5 is operated as follows:
In the high voltage generating circuit 1, the rectangular wave voltage signal is applied to the base terminal of the transistor 4. In this case, the collector current flows during the beam scanning period, but the collector current is abruptly shut off in the blanking period, so that a high voltage pulse is generated in the secondary side of the flyback transformer 2 in the blanking period. The rectifier circuit 3 amplifies this high pulse voltage, and provides a high anode voltage HV (6~7 kV). This anode voltage HV varies in accordance with the anode current, and the capacitor 17 of the correction section 16 is charged with the low voltage ΔHV proportional to the anode voltage HV by the above-mentioned pulse voltage, as shown in FIG. 2.

Figure 6:
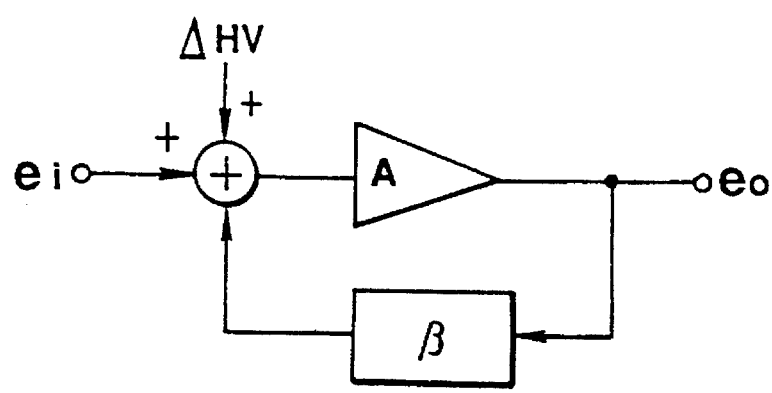
FIG. 6 is a circuit diagram showing an equivalent circuit of a keystone correction circuit of the second embodiment.

In the vertical deflection circuit 20, the vertical drive section 108 amplifies the sawtooth voltage outputted from the vertical oscillating section 107 at the predetermined gain A. FIG. 6 shows an equivalent circuit of the vertical drive section 108. The output voltage $e_0$ with respect to the input voltage $e_i$ is;

$$\begin{aligned} e_0 &= A(e_i + \Delta HV - \beta e_0) \\ &= \{A/(1+A\beta)\} \cdot e_i + \{A/(1+A\beta)\} \cdot \Delta HV \\ &= \{A/(1+A\beta)\} \cdot (e_i + \Delta HV) \end{aligned}$$

Therefore, the output voltage $e_O$ varies in proportion to the low voltage ΔHV. The vertical deflecting coil 115 is driven in accordance with the output voltage $e_0$. As a result, the vertical deflection current varies in proportion to the anode voltage HV. It is possible to hold the picture size approximately constant irrespective of variation of the anode voltage by setting the circuit gain of the vertical drive section 108 at a desired value.

According to the present invention, the flat CRT television system of the separate type is so arranged that the level of the horizontal/vertical deflection voltage is variable in accordance with the anode voltage. Therefore, the present invention can prevent the undesired zooming by holding the picture size approximately constant, minimize the overscanning, reduce the cost, stabilize the picture, and improve the performance and quality.

In the illustrated examples of the present invention, the output of the first transistor is adjusted by the low voltage of the correction power source section, so that the control is feasible at a low output level. The capacitor of the correction power source section can further reduce the cost of the CRT system.

What is claimed is:

1. A television monitor having a flat type cathode ray tube, comprising:

a vertical deflection coil;

high voltage generating means for generating a high voltage applied to an anode electrode of said cathode ray tube;

vertical deflection circuit means for supplying a deflection signal to said vertical deflection coil, said deflection circuit means being provided separately from said high voltage generating means;

correcting voltage generating means connected to said high voltage generating means for generating a correcting voltage proportional to said high voltage generated by said high voltage generating means; and keystone distortion correction means receiving said correcting voltage, a feedback signal derived from one side of said vertical deflection coil and a sawtooth waveform of a vertical scan period for producing a sawtooth waveform current for driving said vertical deflection circuit means, so that a raster size of the cathode ray tube is stabilized for distortion in the shape of an inverted trapezoid, regardless of fluctuation of said high voltage.

2. A television monitor according to claim 1 wherein said keystone distortion correction means includes transistor means for producing the sawtooth waveform current applied to said vertical deflection circuit means, said correcting voltage, said feedback signal and said sawtooth waveform being supplied to a base electrode of said transistor means.

3. A television monitor according to claim 2 wherein a second correcting signal having a vertical deflection frequency and a sawtooth waveform is supplied to said control electrode of said transistor means.

4. A television monitor according to claim 1 wherein said keystone distortion correction means includes gain control means for amplifying the sawtooth waveform current fed to said vertical deflection circuit means.

5. A television monitor according to claim 1, wherein said high voltage generating means includes a flyback transformer, and said correcting voltage generating means includes a diode connected to said flyback transformer and a capacitor connected to said diode, whereby said correcting voltage is formed by a voltage across said capacitor.

6. A television monitor according to claim 1 wherein said keystone distortion correction means comprises first and second transistors, said first transistor receiving at a base lead the sawtooth waveform having the vertical period, the feedback signal and the correcting voltage and having a collector lead connected to a base lead of said second transistor, wherein an emitter lead of said second transistor produces said sawtooth waveform current of a vertical period applied to said vertical deflection coil by said vertical deflection circuit means.

7. A television monitor having a flat type cathode ray tube, comprising a vertical deflection coil high-voltage generating means for generating a high-voltage applied to an anode electrode of said cathode ray tube;

correction voltage generating means connected to said high-voltage generating means for generating a correcting voltage proportional to said high voltage generated by said high voltage generating means;

a vertical oscillator producing a sawtooth waveform of a vertical scan period;

a vertical drive section receiving said sawtooth waveform, a feedback signal derived from one side of the vertical deflection coil and said correcting voltage for producing an amplified output signal having a sawtooth waveform of a vertical period; and a vertical output section receiving said amplified output signal and supplying a vertical deflection current having a sawtooth waveform to said vertical deflection coil, so that the vertical deflection current varies in proportion to the high voltage applied to said anode and to said feedback signal.

* * * * *